(12) United States Patent
Koeppen

(10) Patent No.: US 6,521,362 B2
(45) Date of Patent: Feb. 18, 2003

(54) ARTICLE OF MANUFACTURE FOR FIRE PREVENTION AND SAFETY APPARATUS CALLED FIRECOVER

(76) Inventor: Andreas Koeppen, 10617-165th Pl. NE., Redmond, WA (US) 98052

(*) Notice: Subject to any disclaimer, the term of this patent is extended or adjusted under 35 U.S.C. 154(b) by 0 days.

(21) Appl. No.: 09/862,264
(22) Filed: May 21, 2001
(65) Prior Publication Data
US 2002/0034600 A1 Mar. 21, 2002

Related U.S. Application Data
(60) Provisional application No. 60/208,071, filed on May 16, 2000.

(51) Int. Cl.$^7$ ................................................ B27N 9/00
(52) U.S. Cl. ........................ 428/921; 169/46; 169/49; 169/50
(58) Field of Search .............................. 169/50, 49, 46; 428/36.9, 926, 921

(56) References Cited
U.S. PATENT DOCUMENTS 5,490,567 A * 2/1996 Speer ........................... 169/50
6,125,941 A * 10/2000 Lokken ........................ 169/50

* cited by examiner

Primary Examiner—Harold Pyon
Assistant Examiner—Jane Rhee

(57) ABSTRACT

An article of manufacture for Fire prevention and safety apparatus of a tarp like device called FireCover of multiple layers with the first layer comprising of a fabric, film, or similar material with a layer of aluminum or similar reflective and nonflammable coating on either or both sides, the second layer is comprised of a fire resistant water absorbent material, the third layer is either material or a type of hosing to direct water across the second layer. This layer may or may not be incorporated into the fourth layer, the fourth layer comprises of material that is fire resistant that is intended to direct the water across the second layer and to smother any sparks or flames that escapes either of the other layers. A fifth layer comprised of a fabric or similar material as described for layer 1 may be attached to the fourth layer, making both sides fire and smoke resistant., The layers are attached to each other in a prescribed fashion and access points are integrated in the Fire Cover to permit water by method of a water/fire hose, to flow through channels between layer 2 and 4 in the fabric, The Fire Cover is also designed to be sold in either in different measurements or standard lengths and have the capability of being attached to each other in predetermined methods or being created as one unit specifically designed for a specific structure or object.

2 Claims, 3 Drawing Sheets

1-10   1-11   1-12   1-13

ARTICLE OF MANUFACTURE FOR FIRE PREVENTION AND SAFETY APPARATUS CALLED FIRECOVER

CROSS REFERENCES TO RELATED APPLICATION

This is a continuation of Ser. No. 60/208,071, filed May 16, 2000.

BACKGROUND OF THE INVENTION

This invention relates generally to the field of fire fighting. This invention relates generally to the field of fire protection and more particularly to an article of manufacture for a tarp like fire prevention and safety apparatus called FireCover.

In the Y2K scare some people believed that the power would fail. Because of this failure they felt there was a major danger of major fire occurring in cities as some people would resort to strange and dangerous methods of heating their homes. This raised the issue of how to protect a home from collateral fires in adjacent homes. Some people believed that if power would failed there would be no water supplies and emergency personal stretched to the limits. The solution to protect ones home from these collateral fires had to rely on limited water supply, and limited manpower.

Ideas that were discounted were fire extinguishers, water guns, and wet blankets. During the thought process it was realized, that infra red radiant heat is a major contributor to the spread of fires, and that whatever was used had to reflect heat as well. I then remembered that it is possible to boil water in a paper cup as the water would not allow the paper from reaching the combustion temperature of paper. It was this realization that started FireCover.

By doing further experiments I confirmed that water would keep materials from melting and burning then the concept of a water cooled, lightweight, inexpensive tarp like device was created.

An old idea that also would be able to protect buildings from collateral fires was Outside sprinklers. However with this type of protection if water flow is interrupted, the sprinkler systems become useless. In addition they require massive amounts of water and they do not protect the structure from flying debris which can shatter windows and allow entry of flaming debris.

SUMMARY OF THE INVENTION

The primary object of the invention is to create a tarp like, water cooled device that protects homes or other structures from fire and smoke.

Another object of the invention is to be lightweight and flexible. A typical embodiment of the FireCover weighs only approximately 9 oz per square yard. However, the FireCover is capable of being lighter or heavier depending upon its application.

Another object of the invention is The Fire Cover's light weight and compactness allows it to be easily stored.

Another object is that FireCover is easily deploy able and can be reused and re deployed as required.

A further object of the invention is The Fire Cover can also be pre-deployed with minimum manpower. One person should be able to fully protect a house with the Fire Cover in a matter of minutes.

Yet another object of the invention is The Fire Cover can protect a typical house (approximate area of 130 square yards) using approximately 3 to 5 gallons of water per minute for the typical house.

Still another object is that the Fire Cover's consumption of water can be increased or decreased depending upon the circumstances.

Still yet another object of the invention is Even if the source of water is constricted or temporarily interrupted, the Fire Cover still provides some fire protection as the water absorbent material will retains water for an extended length of time.

Another object of the invention is The Fire Cover is also designed to allow fire retardant liquids or materials to replace the water without any degradation to the Fire Cover itself or any negative impact on the Fire Cover's performance.

Another object of the invention is The Fire Cover does not use any hazardous chemicals.

A further object of the invention is The Fire Cover protects against the effects of Infra red, radiant heat.

Yet another object of the invention is The Fire Cover can be deployed on only vulnerable sides of structures or objects.

Still yet another object of the invention is The Fire Cover can be customized for the size, weight, ballistic penetration properties, depending on application.

Another object of the invention is The protected structures or objects need not be manned.

Another object of the invention is In some applications, such as hanger bays, fuel storage depots, and tunnels, the Fire Cover can be deployed automatically.

A further object of the invention is Water need not be applied until it is required, allowing the Fire Cover to be re-deployed readily, and to save scarce water supplies.

Yet another object of the invention is The Fire Cover can be fashioned into temporary structures, such as a tent, to protect vehicles and smaller structures.

Still yet another object of the invention is The Fire Cover will continue to provide fire protection even if it becomes damaged.

Other objects and advantages of the present invention will become apparent from the following descriptions, taken in connection with the accompanying drawings, wherein, by way of illustration and example, an embodiment of the present invention is disclosed.

An article of manufacture for fire prevention and safety apparatus called FireCover comprising of several layers:

the first layer is comprised of a fabric, film, or similar material with a layer of aluminum or similar reflective and nonflammable coating on either or both sides. The second layer is comprised of a fire resistant and water absorbent material. The third layer is either a material or a type of hosing designed to direct water across the second layer. This layer may or may not be incorporated into the fourth layer. The fourth layer comprises of a material that is fire resistant that is intended to direct the water across the second layer, and to smother any sparks or flames that escapes either of the other layers. It is also intended to cool the structure or object that the FireCover is protecting. A fifth layer comprised of a fabric or similar material as described for layer 1 maybe attached to the fourth layer, thus making both sides fire and smoke resistant. The layers are attached to each other in a prescribed fashion and access points are integrated in the FireCover to permit water or any fire resistant or retardant material, typically by method of a water hose, to flow through channels between layer 2 and 4 in the fabric. The Fire Cover is also designed to be sold either in different measurements or a standard length and have the capability of being attached to other sheets of FireCover using various connection devices. In the preferred embodiment, one or more water or fire resistant hoses are designed to be attached to one or more access points on the Fire Cover. The water or fire resistant or retardant material from the hoses are then designed to flow at a predetermined range of rates through spaced channels in the Fire Cover while the Fire Cover is covering or shielding a structure or object..

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
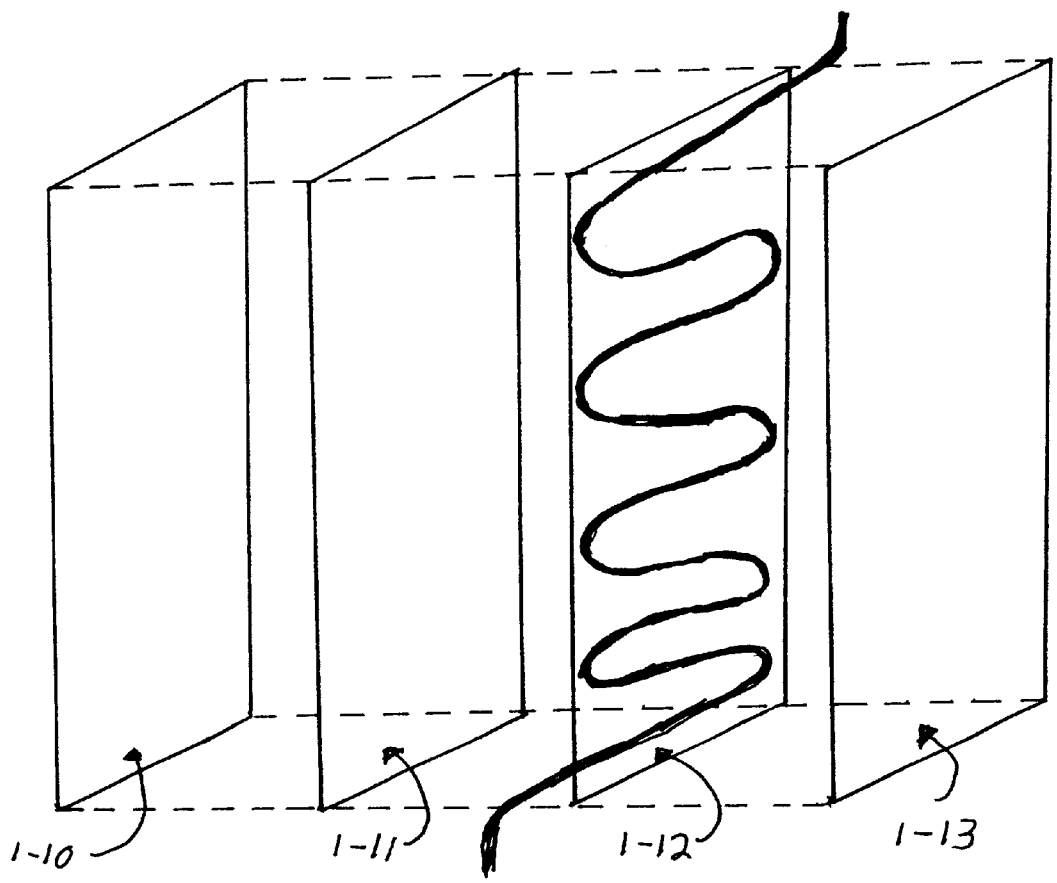
FIG. 1 is a schematic diagram illustrating the components of FireCover
Figure 2:
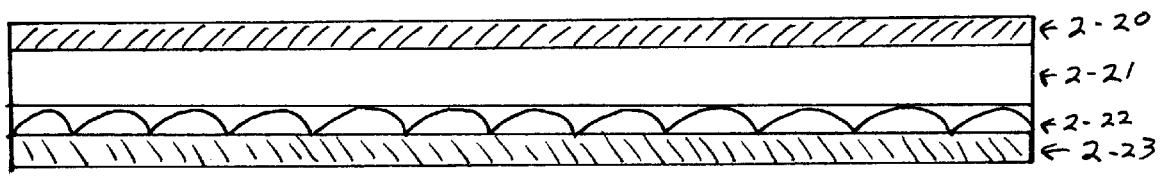
FIG. 2 is a cross sectional view of the invention detailing how water flows through FireCover
Figure 3:
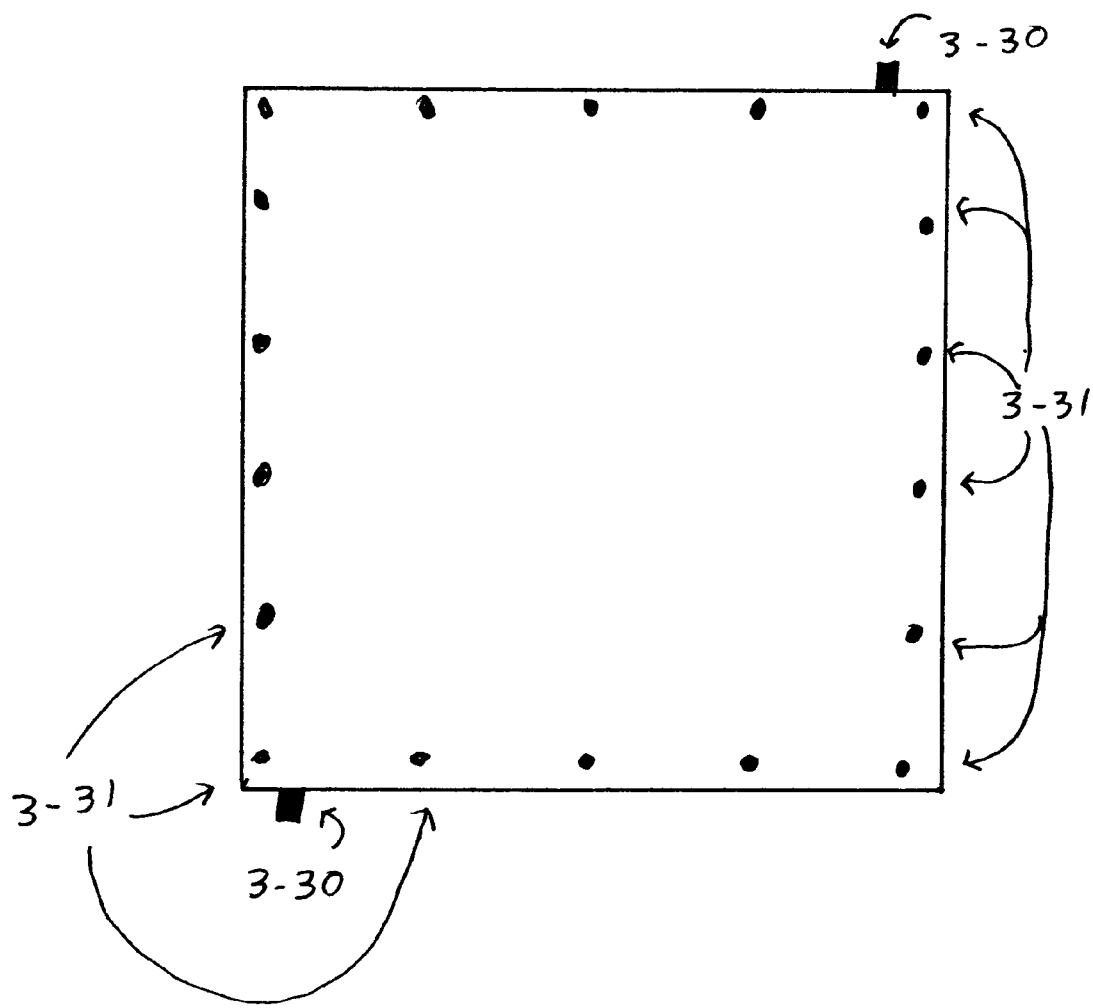
FIG. 3 is a plan view of FireCover showing connection points for fire/water hoses, and other FireCovers

FireCover is a tarp like device made up of 4 or more layers as shown in FIG. 1 and FIG. 2. The first layer (as shown in FIG. 1-10 and FIG. 2-20) is comprised of a fabric, film or similar material with a layer of aluminum or similar reflective and nonflammable coating on either or both sides. The second layer (as shown in FIG. 1-11 and FIG. 2-20) is comprised of a fire resistant, water absorbent material. It's purpose is to absorb water so that layers above and below it will not be damaged by high temperatures.

The third layer (as shown in FIG. 1-12) is either material or a type of hosing. It is used to direct water over the second layer of material. Water in the ideal situation would be constantly replenished, and replaced by this third layer, as it would be connected to an outside source of water connected to it (as shown in FIG. 3-30).

The forth layer (as shown in FIGS. 1-13 and 2-22) is also fire resistant. It's purpose is to aid in the distribution of water across the second layer, to smother any sparks or flaming that escape either of the other layers. It too maybe water absorbent, but it should be breathable so that water can evaporate from layers one and two so as to aid drying FireCover after it has been used.

A fifth layer maybe added that is similar to the first layer in is comprised of a fabric, film or similar material with a layer of aluminum or similar reflective and nonflammable coating on either or both sides. With this layer FireCover can protect from fire on either side, such as would be used in tunnel use.

FIG. 2-21 shows channels that water would flow through in soaking layer two with water.

The layers maybe connected to each other by lamination or stitching or a combination of lamination and stitching.

FIG. 3-30 shows access point that would connect FireCover to either water or fire hoses. FIG. 3-31 shows connection point that would allow FireCover to be connected to other FireCovers to create a larger FireCover. As many FireCovers as is required for any purpose maybe connected to each other. Also FireCover can be created in any size or shape required. It may also be shaped to become a tent like shelter to protect vehicles or smaller structures.

The typical embodiment of FireCover all materials would be as light as possible creating a tarp like sheet that weights approximately 9 oz per square yard. However heavier or lighter material may also be used depending on the protection requirements. In addition other material that would confer Ballistic protection against projectial caused by explosions, may also be added.

When water is present, FireCover's protected side temperature would not exceed 100 degrees Celsius. Water flow through FireCover can be regulated and either increased or decreased depending on the amount of protection desired.

For Tunnel use, FireCover would be constructed like a curtain and provide a flexible barrier that can stop smoke and flame, while at the same time allowing persons to escape.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An article for fire prevention comprising four layers of material including hosing in one of the layers, wherein the layers are combined by either stitching, laminating or combination of stitching and laminating to form a water cooled tarpaulin device, wherein the first layer is a radiant heat reflective aluminum layer, wherein the second layer comprises a fire resistant, water absorbent material, wherein the third layer is a hose with space channels to direct water across the layers, and the end of the hose has connection points that allows access to external water supplies wherein the fourth layer distributes water across the second layer and is a gas permeable material that permits the entire device to dry out and be reused after the application of a coolant liquid.

2. An article of a water cooled tarpaulin device as in claim 1, which is of any size or shape, wherein the liquid is water or any other fire resistant liquid, wherein the liquid flows at a predetermined rate and is directed by internal flexible hosing, channels, and fabric to wet and cool the device.

* * * * *